Sept. 24, 1968  G. HAGLUND  3,402,919

CONTACTING APPARATUS FOR GASES AND LIQUIDS

Filed July 5, 1966  4 Sheets-Sheet 1

INVENTOR.
GUSTAF HAGLUND
BY
Young + Thompson
ATTYS.

Sept. 24, 1968  G. HAGLUND  3,402,919
CONTACTING APPARATUS FOR GASES AND LIQUIDS
Filed July 5, 1966  4 Sheets-Sheet 3

INVENTOR.
GUSTAF HAGLUND
BY
Young + Thompson
ATTYS.

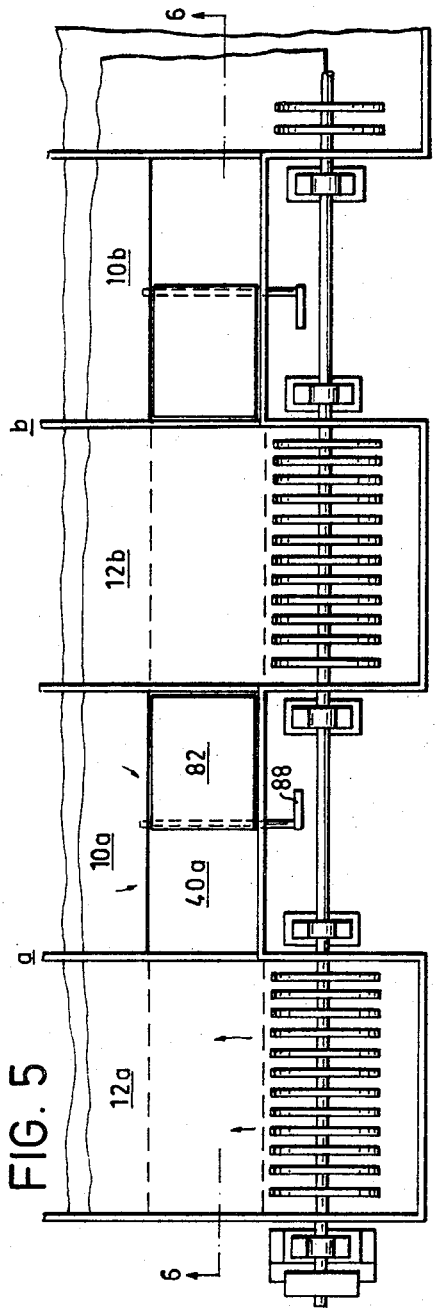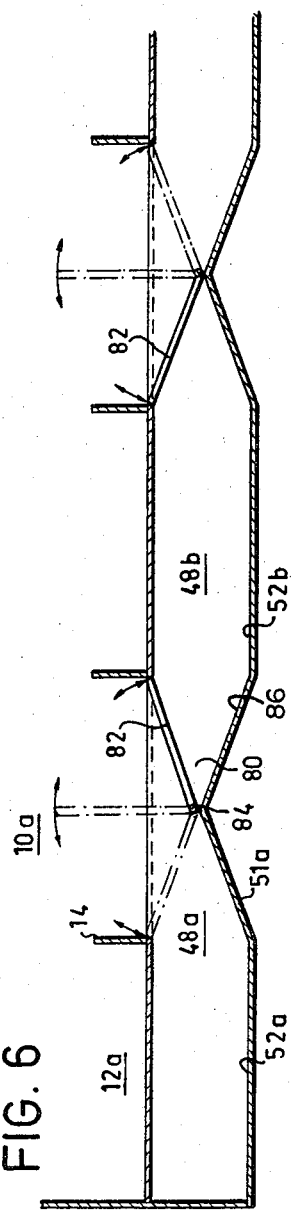

United States Patent Office 3,402,919
Patented Sept. 24, 1968

3,402,919
CONTACTING APPARATUS FOR GASES
AND LIQUIDS
Gustaf Haglund, Backvagen 20, Enskede, Sweden
Filed July 5, 1966, Ser. No. 562,884
Claims priority, application Sweden, July 15, 1965,
9,371/65
5 Claims. (Cl. 261—92)

ABSTRACT OF THE DISCLOSURE

Apparatus for effecting contact between a liquid and a gas, of the type in which two upwardly open elongated compartments are disposed side by side in a receptacle, with a rotor at one end of one compartment and a rotor at the opposite end of the other compartment partially immersed in the liquid in the receptacle, is improved by the provision of a channel at the end of each end of each compartment opposite the end in which the rotor is disposed. The channel extends below the level of the bottom of the compartments, and inclines downwardly from its own compartment toward the other compartment, and then inclines upwardly and emerges behind and below the rotor of the other compartment.

---

Figure 1:
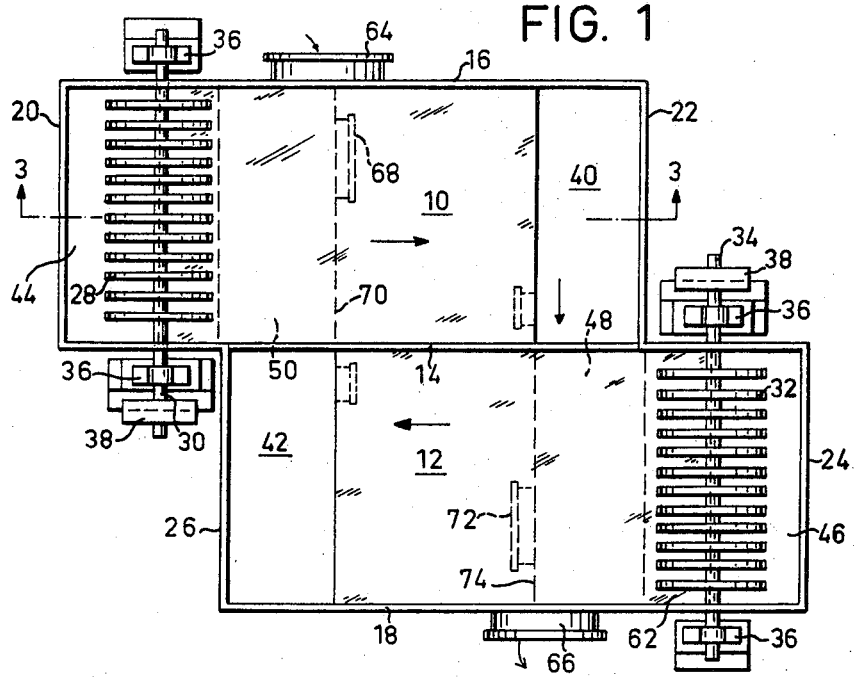

The present invention relates to contacting apparatus between a liquid and a gas, comprising a receptacle with side walls and end walls in the horizontal plane forming rectangles or substantially forming rectangles, of which two adjacent ones, having their end walls displaced in relation to each other, have one long side partly in common resulting in a receptacle divided by a partition wall of a height higher than the maximum level of the liquid to be treated into two separate compartments for the liquid, the space above the surface of the liquid forming one uninterrupted gas chamber, whereby in the displaced end section of each compartment there is a rotor partly submerged in the liquid in the liquid compartment above the bottom of the receptacle, the balance of the compartment right onto its opposite end wall not being equipped with any rotors.

The side walls and the end walls of the receptacle being rectangular in the horizontal plane does not imply, that the invention is limited to apparatus with a bottom outline exactly of geometrically rectangular shape, even though this design is the simplest one and most useful in practice. The shape of the bottom surface may deviate from an exactly rectangular design, and the side walls and end walls of the receptacle need not be exactly flat. Thus, the side walls may be slightly curved or form several planes without this fact constituting any deviation from the principle of the invention.

An apparatus of the type indicated above, by way of example, is described in Canadian Patent No. 690,860. In such apparatus the functions of the splashing rotors is greatly dependent upon the efficient circulation of the liquid to be treated between the rotors, and moreover, upon the uniform distribution of the liquid between them. Solid, finely divided reaction products may be added to the liquids to be treated, or they may take up solids from the gases. Compounds difficult to dissolve may precipitate from the liquids by possible chemical reactions. Such conditions put the apparatus performing the distribution of the liquid betwen the rotors to a severe test with respect to the proper maintaining of the speed of the liquid in motion, its homogeneity, turbulence and the uniform dispersion of solids preventing their sedimentation. At the same time all connecting channels and space occupied by the liquid should be readily accessible for inspection and cleaning. Nor should channels for liquid and chambers communicating with each other constitute any obstacles to the installation of driving units for the rotors or the work involved in their mounting. The invention may be applicable to apparatus with two compartments, each one comprising a chamber for liquid and a chamber for gas, but it may also be used applied to apparatus with several compound sections, in which each section is constituted by two compartments of the characteristics indicated.

The invention relates to an arrangement, which substantially improves the performance of an apparatus of the kind described, by the fact that it makes possible a desirable communication between the different compartments of the receptacle, so that a particularly good circulation of liquid can be maintained between them, and that the resulting motion of the liquid will be uniform, having the desired speed and turbulence impeding sedimentation. The most characteristic feature of the invention is primarily, that between the end part of one compartment not being equipped with a rotor and the protruding end part of the other compartment being equipped with a rotor there is a communication channel extending below the bottom level of the receptacle, which channel has one of its inlets in the bottom of the first mentioned compartment and its other inlet in the bottom of the last mentioned compartment. The two channels of communication which may be symmetrically positioned at the ends of the receptacle establish the desired communication between the chambers for liquid of the two compartments and make possible the proper functions of the liquid.

A particularly suitable embodiment of the communication channel will be provided, if the channel bottom is given a downward inclination parting from its inlet in the compartment not equipped with a rotor in a direction transverse to the length of said compartment until a low point situated below the bottom of the adjoining compartment of the receptacle, and from this low point extends obliquely in the longitudinal direction of this latter compartment towards its inlet in the bottom of the same. By such an arrangement a particularly well functioning outflow from one compartment will be obtained as well as a properly functioning inflow into the other compartment relative to the position of the rotor of said compartment. In apparatus with several compound sections, each one comprising two compartments of the embodiment indicated, the downwardly inclined channel bottom from the compartment end not equipped with a rotor may be provided with an inlet to a connection with a compartment of an adjoining section, and this inlet may be provided with a closing gate or similar device, being adjustable in different positions from completely open to completely closed and vice versa. This arrangement makes possible the transfer of a required quantity of liquid from one section to another. The gate may conveniently be arranged to the effect, that, in an open position relative to the opening in the channel bottom leading to the compartment end not equipped with a rotor of one of the sections, it keeps the connection open between this compartment and the adjoining compartment of the other section, at the same time keeping the channel portion leading to the compartment end equipped with a rotor in the first mentioned section closed. In this position the gate, thus, will constitute a part of the inclining channel bottom.

Figure 2:
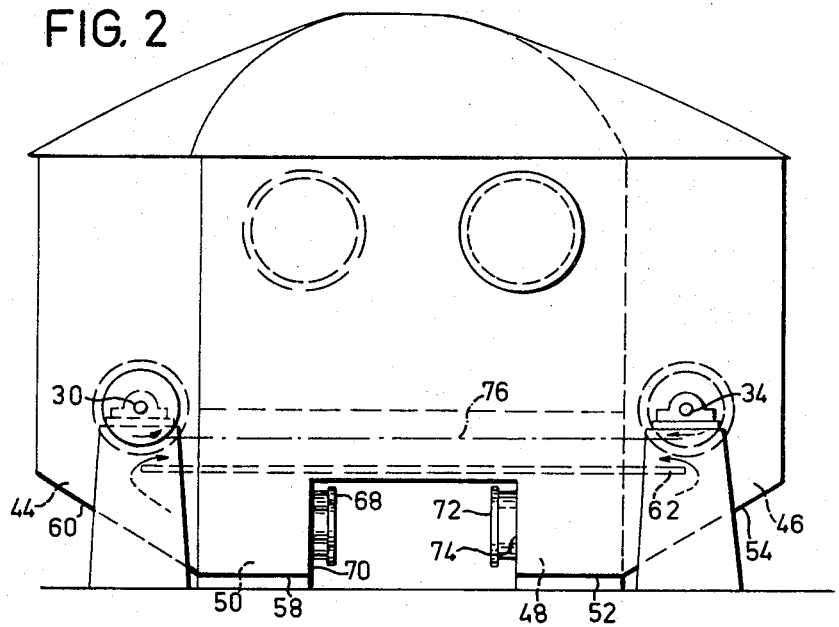
Figure 3:
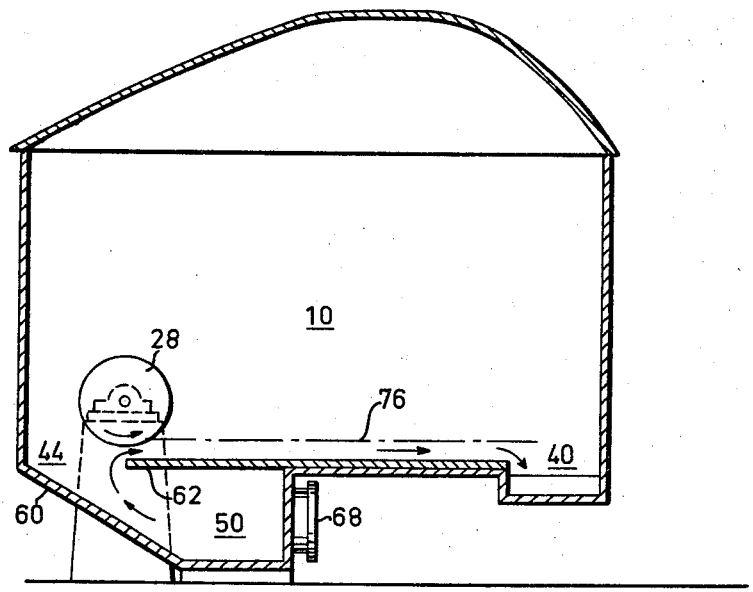
Figure 4:
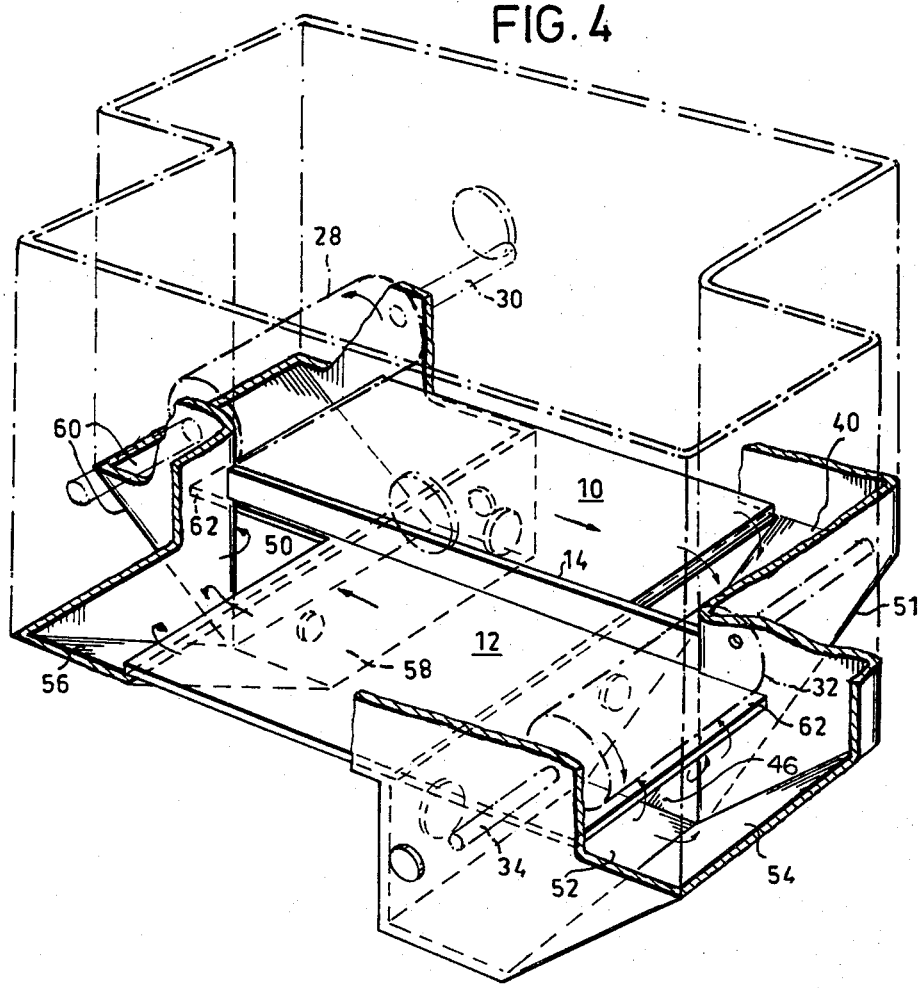

The invention will be more particularly disclosed by an example of its embodiment, which is shown in the accompanying drawings. FIG. 1 illustrates a top plan view of an apparatus comprising two compartments, the top side or roof of the receptacle being removed. FIG. 2 shows a vertical projection of the apparatus illustrated in FIG. 1, and in FIG. 3 is shown a vertical section taken substantially along the line 3—3 in FIG. 1. FIG. 4 is a perspective view of the lower part of the apparatus with certain portions removed in order to exhibit the connection channels between the compartments. FIG. 5 shows a fragmentary horizontal projection of one end portion of a multiple section apparatus, each section with compartments according to FIG. 1. FIG. 6 is a vertical sectional view taken substantially along the line 6—6 in FIG. 5.

The apparatus illustrated in FIGS. 1 to 4 comprises one receptacle with two compartments 10, 12 each one of substantially rectangular bottom area, the rectangles in respect to their end portions being displaced in their relative position to each other. One of the longitudinal sides of the rectangles is common to both compartments to a certain extent, and here is a low partition wall 14 by which the compartments will have separate divisions for liquid in their inferior portion. Each one of the compartments 10, 12 has an outer side wall 16, 18 and two opposed end walls 20, 22 and 24, 26, respectively. In the protruding end section of the compartment 10 there is a rotor 28 fitted on a shaft 30, and in a similar way the compartment 12 is equipped with a rotor 32 fitted on the shaft 34. The shafts are carried in bearings 36 and may be given a rotating action by a driving unit 38, which makes the shafts 30, 34 rotate in opposite directions. In FIG. 2 the shaft 30 is, thus, intended to rotate in counter clockwise direction and the shaft 34 in clockwise direction.

The compartment 10, in its end section not equipped with a rotor, is provided with a bottom opening 40 extending all along the width of the compartment and the compartment 12 at the bottom is provided with a similar opening 42. The bottom opening 40 forms the inlet of the connecting channel 48, and the bottom opening 42 is the inlet of the connecting channel 50, which channels extend below the bottom level of the receptacle interconnecting the compartments with each other. The connecting channel 48 has a bottom 51 inclining downwards from the compartment 10 and ending at a horizontal bottom portion 52 (FIG. 4) and from this point the channel bottom 54 extends upwards in oblique fashion ending at a point behind the rotor 32, where the opening 46 is located. The liquid is intended to flow from the compartment 10 down through the bottom opening 40 along the downwards inclining bottom 51 of channel 48 and then upwards along the inclining bottom 54 to the inlet or bottom opening 46 behind the rotor 32. In a similar way liquid is intended to flow from the inlet 42 of the compartment 12 through the channel 50 in direction to the compartment 10 along its inclining bottom 56 to its lowest horizontal bottom portion 58 and then upwards along its inclining bottom portion 60 in the longitudinal direction of compartment 10 flowing into that compartment through the bottom opening 44 behind the rotor 28. It is to be understood, that the bottoms of the compartments 10, 12 with a portion 62 protrude under the rotors 28 and 32, their outside edge limiting the bottom openings 44 and 46. The lowest horizontal portions 58, 52, respectively, of the connecting channels 48, 50, respectively, are situated under the bottoms of the respective compartments 12 and 10, and as it is suitable to have them positioned at the same level their lower surfaces may serve the purpose of being base plates for the receptacle.

When the apparatus is in operation, gas is introduced in the gas reaction chambers, above the levels of the liquid in both compartments 10, 12, through an opening 64 in the outer side wall 16 of compartment 10 and is drawn off through an opening 66 in the outer wall 18 of compartment 12. Liquids and reaction compounds are introduced through an opening 68 in a vertical wall of the connecting channel 50, while liquids and reaction compounds are discharged through an opening 72 of a vertical cross wall 74 defining the connecting channel 48. The liquids are put in motion in the compartments 10 and 12 and between them through the connecting channels 48 and 50 by the splashing rotors 32 and 28. The motion varies according to the rotation speed of the rotors and to what extent they are submerged in the liquids, and in accordance with the conditions chosen, a varying splashing effect of liquid in the gas chamber above the chambers of liquid is obtained.

When the apparatus is in operation, gases, introduced through a connection at the opening 64 and discharged through a connection at the opening 66, flow through the same, and liquid is let in through a connection at the opening 68 and discharged through a connection at the opening 72, at the same time as liquid contained in the apparatus is circulating between the rotors in quantities, which may by a great number of times exceed the quantity of liquid introduced into and discharged from the apparatus. It is implied that in operation the rotors 28 and 32 rotate at approximately the same speed and in opposite directions and are submerged to the same extent at a depth marked with a dotted and dashed line 76 being the level of the liquid in the reaction chamber of liquids of the apparatus. The rotating action of the rotors causes the rotor 28 to push the liquid in perpendicular direction to its axis 30 across the floor of the apparatus towards the channel 48 with its open portion 40 relative to the floor plan, whence the liquid continues through the portion of the channel 48, which is covered by the floor of compartment 12 with the rotor 32. From this part of the channel 48 the liquid flows upwards through the opening 46 of this channel portion in a direction towards the rotor 32 and up behind the rotor 32 and across the floor 62 which ends about right under the rotor. The rotor 32 then pushes the liquid in the same manner as was the case with rotor 28, and across the floor towards the channel 50 which handles the liquid in the same way as described for the channel 48. At the center portion of the apparatus the liquid flows thus move in opposite directions on each side of the partition wall 14. The circulation course is indicated with arrows in the schematic drawings.

By the described arrangement it will be possible for the liquid to flow in a suitable manner from one compartment to another maintaining the speed of flow, turbulence and suspension conditions prevailing in the compartments as well as providing the rotors with a uniformly distributed liquid. The connecting channels with their open inlets and outlets extending all along the width of the compartments under the floor of the apparatus will permit good visibility, control and facilities for cleaning as well as connection possibilities for the easy charge and discharge of liquids and admixture of reaction compounds. The lowest portions of the connecting channels also constitute good surfaces for the proper installation of the apparatus on a foundation.

An apparatus of the described embodiment may be joined together with another or several other apparatus of similar design to form a larger unit, of which each apparatus will constitute a section, having each one two compartments as described above. In such a unit the liquid shall be able to circulate not only within each section but also from one section to another in desired quantities and in any required direction. This can be achieved if the compound structure will be carried out in a way illustrated in FIGS. 5 and 6. In the embodiment shown there are two compound sections $a$ and $b$, each one comprising compartments 10$a$, 12$a$ and 10$b$, 12$b$, respectively. By way of example the bottom 51$a$ of the channel 48$a$ may extend in a downwards inclining direction from the inlet 40$a$ of the end portion of compartment 10$a$ in the section, said portion being the one not equipped with a rotor, towards the horizontal bottom portion 52$a$ of the channel. The upper portion of the inclining channel bottom 51$a$ is provided with an opening 80, and this opening can be equipped with a gate 82 pivoting about an axis 84. By the opening 80 the chamber for liquid of compartment 10$a$ may be connected with the compartment 12$b$ of the adjoining section $b$. The gate 82 is adjustable between the position indicated by the continuous lines in FIG. 6, where it completely closes the opening 80 to any desired position until it reaches the lower position indicated with dashed and dotted lines, in which it completely shuts off the channel 48a leaving the opening 80 completely open. In the last mentioned position the gate 82 constitutes an extension of an including channel bottom 86, extending in upward direction from the lowest bottom portion 52b of a connecting channel 48b between the compartments 10b and 12b of section b. This channel also may be equipped with a gate similar to gate 82. The channels 48a and 48b of the different sections may, thus, be connected with each other, so that liquid may flow from one section to another, the volume of the flow being regulated by the position of gate 82. The axis of the gate 82 may be provided with a handle or similar device, accessible on the outside of the apparatus, so that the gate may be set in any desired position. In FIG. 5 only one end portion of the respective compartments is shown, but it is understood, that a similar channel system with adjustable shutting off device like a gate or similar arrangement may be arranged at the other end portion.

What I claim is:

1. In apparatus for effecting contact between a liquid and a gas and comprising a receptacle having side and end and bottom walls defining a pair of elongated compartments disposed in side-by-side relation, a pair of rotors one disposed in one end of one said compartment and the other disposed in the opposite end of the other said compartment, and means for rotating the rotors about horizontal axes transverse to the length of the compartments; the improvement comprising means defining a pair of channels one at each end of the compartments, each said channel extending below the level of said bottom walls of the compartments and communicating between the adjacent ends of the two compartments.

2. Apparatus as claimed in claim 1, there being openings at opposite ends of the bottom wall of each compartment through which said channels communicate between the compartments.

3. Apparatus as claimed in claim 2, said compartments being displaced lengthwise relative to each other so that one end of one compartment extends beyond the adjacent end of the other compartment and one end of said other compartment extends beyond the other end of said one compartment, said rotors being disposed in said extending ends of said compartments, each said channel extending from the end of a said compartment opposite the rotor end of the compartment transversely of the length of the compartments and beneath the bottom wall of the adjacent compartment and thence toward the end of said adjacent compartment in which the rotor is disposed before emerging upwardly through the bottom wall of said adjacent compartment.

4. Apparatus as claimed in claim 3, the channels having bottom walls that are inclined downwardly transversely of the length of the compartments and then incline upwardly in a direction lengthwise of the compartments before emerging adjacent a said rotor.

5. Apparatus as claimed in claim 4, in which each said rotor is disposed lengthwise of its associated compartment beyond the transversely inclined bottom wall of the channel in the adjacent compartment.

References Cited

UNITED STATES PATENTS 2,736,390 2/1956 Wickland _____ 261—90 XR
2,934,325 4/1960 Haglund _____ 261—92

FOREIGN PATENTS 690,860 7/1964 Canada.
935,162 8/1963 Great Britain.

HARRY B. THORNTON, *Primary Examiner.*

TIM R. MILES, *Assistant Examiner.*